United States Patent [19]

Gupta et al.

[11] Patent Number: 5,625,045

[45] Date of Patent: Apr. 29, 1997

[54] PROCESS FOR THE PRODUCTION OF LOW VISCOSITY HIGH FUNCTIONALITY, LIGHT COLORED POLYETHERS BASED ON SUCROSE

[75] Inventors: Pramod Gupta, Bedburg; Hans-Joachim Sandhagen, Dormagen; Werner Betz, Odenthal; Ulrich Leyrer; Martin Hoppe, both of Leverkusen, all of Germany

[73] Assignee: Bayer Aktiengesellschaft, Leverkusen, Germany

[21] Appl. No.: 210,781

[22] Filed: Mar. 18, 1994

[30] Foreign Application Priority Data

Mar. 31, 1993 [DE] Germany .............. 43 10 504.1

[51] Int. Cl.[6] .............. C07H 1/00; C07H 15/04
[52] U.S. Cl. .............. 536/18.6; 536/120; 536/124
[58] Field of Search ................. 536/120, 124, 536/18.6

[56] References Cited

U.S. PATENT DOCUMENTS

| | | | |
|---|---|---|---|
| 2,902,247 | 9/1959 | Anderson | 536/120 |
| 3,085,085 | 4/1963 | Wismer et al. | 536/18.6 |
| 3,153,002 | 10/1964 | Wismer et al. | 536/123.13 |
| 3,941,769 | 3/1976 | Maassen et al. | 260/209 R |
| 3,941,796 | 3/1976 | Sankey et al. | 536/120 |
| 4,230,824 | 10/1980 | Nodelman | 521/167 |
| 4,332,936 | 6/1982 | Nodelman | 536/120 |
| 4,996,310 | 2/1991 | Acosta | 536/124 |

FOREIGN PATENT DOCUMENTS 1467954  3/1977  United Kingdom .

OTHER PUBLICATIONS

J.W. LeMaistre and R.B. Seymour, Journal of Organic Chemistry, p. 782, 1948.

*Primary Examiner*—John Kight
*Assistant Examiner*—Everett White
*Attorney, Agent, or Firm*—Joseph C. Gil; Lyndanne M. Whalen

[57] ABSTRACT

High functionality, low viscosity, light colored sucrose-based polyethers are prepared by reacting a starter mixture containing i) approximately 100 parts by weight of sucrose, ii) from about 30 to about 1000 parts by weight of a low molecular weight, relatively high valency alcohol and/or an alkoxylation product of such an alcohol and iii) an alkali metal hydroxide which has been prepared at a temperature of from about 20° to about 110° C. with an alkylene oxide at a temperature of from about 90° to about 130° C. and at a pressure of from about 0.3 to about 4 bar excess nitrogen pressure. These polyether polyols are particularly useful for the production of polyurethanes, particularly rigid polyurethane foams.

9 Claims, No Drawings

PROCESS FOR THE PRODUCTION OF LOW VISCOSITY HIGH FUNCTIONALITY, LIGHT COLORED POLYETHERS BASED ON SUCROSE

BACKGROUND OF THE INVENTION

The present invention relates to a process for the production of low viscosity, sucrose-based polyether polyols.

Polyether polyols based on sucrose useful for the production of polyurethane rigid foams are known. These polyether polyols are typically produced by reacting sucrose with alkylene oxides in the presence of sodium hydroxide. (See, for example, J. W. Le Maistre, R. B. Seymour, *J. Org. Chem.* 782, 1948).

U.S. Pat. Nos. 3,085,085 and 3,153,002 describe the reaction of sucrose with ethylene oxide and propylene oxide at elevated temperatures using potassium hydroxide as a catalyst to produce sucrose hydroxyalkyl ethers.

Variations of the process described in these disclosures result in sugar ethers having functionalities which are significantly lower than the functionality of pure sucrose polyethers. This reduced functionality is due to the formation of glycols as a result of the reaction of water with epoxides.

U.S. Pat. No. 2,902,478 discloses a process in which sucrose is suspended in epoxide and reacts to form the polyether. This process has the advantage that no lowering of functionality by glycol formation takes place. The viscosity of such polyethers, however, is very high. In addition, such reactions may present safety problems in production plants.

U.S. Pat. No. 3,941,769 discloses a process in which sucrose is reacted with epoxide in an organic; dispersing agent such as benzene, toluene, ethylbenzene, xylene or chlorobenzene (boiling range 80°–180° C.). This process has some serious disadvantages. First, the dispersing agents lower the reaction capacity by 10–40%. Second, the dispersing agent must be removed at the end of the production process. The products obtained by this process are highly functional, highly viscous (104,000–400,000 mPa·s) due to the degree of alkoxylation, and have an intense brown color. The intense color results from undesirable side reactions and caramelization of the sucrose used.

U.S. Pat. No. 4,230,824 describes the production of high functionality polyethers (i.e., functionality >6.5) based on sucrose and polyalkylene polyamines in which ethylene oxide or propylene oxide in toluene is used as the dispersing agent in a process which otherwise corresponds to that disclosed in U.S. Pat. No. 3,941,765. The product obtained has a Gardener color number of 12.

U.S. Pat. No. 4,996,310 discloses a process for the production of low viscosity, sucrose-based polyethers having a high ethylene oxide content, a functionality of 4.4–4.5, a viscosity of from 830 to 2500 mPa·s at 25° C. and Gardener color numbers of from 10 to 40.

No process for the production of high functionality, low viscosity, light colored sucrose polyethers is known. The prior art processes discussed above only partly fulfill these requirements.

SUMMARY OF THE INVENTION

It is an object of the present invention to provide a process for the production of sucrose-based polyether polyols which have a high functionality, low viscosity and light color.

It is also an object of the present invention to provide a process for the production of high functionality, low viscosity, light colored sucrose-based polyether polyols which does not create significant safety problems or generate significant amounts of unwanted by-products.

It is a further object of the present invention to provide a simple, uncomplicated process for the production of sucrose-based polyether polyols having good properties which does not pose substantial safety risks.

These and other objects which will be apparent to those skilled in the art are accomplished by subjecting mixtures of sucrose and low molecular weight polyol to an alkoxylation reaction in the presence of very small quantities of alkali metal hydroxide catalysts.

DETAILED DESCRIPTION OF THE INVENTION

The present invention relates to a process for the production of sucrose-based polyether polyols by alkoxylation of sucrose. In this process, a mixture of sucrose and low molecular weight polyfunctional polyol or an alkoxylation product of a low molecular weight polyol is prepared at a temperature of from about 20° to about 110° C. This mixture is made up of (a) approximately 100 parts by weight of sucrose, (b) from about 30 to about 1000 parts by weight of a low molecular weight polyfunctional polyol and/or its alkoxylation product. A small quantity of alkali metal hydroxide catalyst is included in this mixture either by direct addition or by use of an alkaline alkoxylation product of a polyfunctional polyol. This mixture is then reacted with one or more alkylene oxides at temperatures of from about 85° to about 130° C. and pressures of from about 0.3 to about 4 bar excess nitrogen pressure.

In a preferred embodiment of the invention, the process is carried out using a polyol having an OH number of from about 800 to about 1200 and a molecular weight of from about 62 to about 420.

It is also preferred that the sucrose be suspended in a polyol such as ethylene glycol, propylene glycol, glycerol, trimethylolpropane, hexanetriol, pentaerythritol or sorbitol and/or alkoxylation products of these polyfunctional alcohols at a temperature of from about 25° to about 80° C.

A small quantity of alkali metal hydroxide is added to the sucrose which is preferably in the form of a sucrose/polyol suspension under a nitrogen atmosphere at a temperature of from about 20° to about 110° C., preferably from about 80° to about 110° C. If the sucrose is suspended in an alkaline alkoxylation product of a polyfunctional alcohol, the quantity of alkali metal hydroxide added may be reduced or it may be completely omitted.

The easily stirrable pasty mixture thus obtained is then heated to a temperature of from about 85° to about 130° C., preferably from about 95° to about 110° C., and then reacted with alkylene oxide at a pressure of from about 0.3 to about 4 bar excess nitrogen pressure, preferably from about 0.5 to about 2.5 bar excess pressure.

The alkylene oxide is preferably used in quantities of from about 0.5 to about 4 mol of alkylene oxide per OH group of the polyol.

Upon termination of the alkylation reaction, the reaction mixture is maintained at a temperature of from about 100° to about 130° C., preferably from about 105° to about 120° C. for a suitable period of time. The polyaddition product is then neutralized with dilute mineral acid. An antioxidant such as 2,6-di-tert.-butyl-1-hydroxy-toluene (BHT) may be added to the neutralized product. Water and any by-products present are removed under vacuum. The salts obtained are removed by filtration.

The low molecular weight polyols to be used in the process of the present invention are water-soluble compounds having a melting point below 100° C. and a molecular weight which is generally in the range of from about 62 to about 420 g/mol. Examples of such compounds include: ethylene glycol, propylene glycol, glycerol, pentaerythritol, sorbitol, trimethylolpropane and products of their alkoxylation with ethylene oxide and/or propylene oxide. Mixtures of two or more of these polyols may, of course, be used with the sucrose instead of a single polyol.

The reaction of the sucrose with alkylene oxide is carried out in the presence of an alkali metal hydroxide catalyst, preferably potassium hydroxide. The quantity of alkali metal hydroxide used is generally from about 500 to about 3000 ppm, preferably from about 600 to about 2500 ppm, based on the weight of the finished polyol.

The alkylene oxides used in the process of the present invention are preferably ethylene oxide, propylene oxide and/or 1,2-butylene oxide. The mixture of sucrose and low molecular weight polyol is reacted with from about 2 to about 90% by weight of ethylene oxide and from about 10 to about 98% by weight of propylene oxide and/or butylene oxide (based on the sum of alkylene oxides), successively or as mixture in one reaction batch.

The process is generally carried out at a reaction temperature of from about 95° to about 130° C., preferably from about 100° to about 120° C. The reaction of the alkylene oxides is carried out at an elevated nitrogen pressure of from about 0.3 to about 4.0 bar excess pressure, preferably from about 0.5 to about 2.5 bar excess pressure.

To produce high functionality, low viscosity, light colored polyether polyols by the process of the present invention, the alkylene oxide is used in an amount such that each molecule of sucrose is reacted, on average, with from about 4 to about 32 mols of alkylene oxide. The polyethers obtained by the process of the present invention have an OH number of from about 200 to about 600, preferably from about 250 to about 500. The arithmetically calculated functionality of these polyether polyols is from about 5.3 to about 7.5.

The polyethers produced by the process of the present invention are clear, very light to slightly yellow, low viscosity products. The viscosity is generally from about 1000 (OH number below 250) to about 19,000 (at OH number 470) mPa·s, depending upon the OH number and the additive content.

The advantages of the process of the present invention include:

(1) No dispersing agent is required because the reaction mixture is easily stirrable due to the use of di-bis-hexafunctional additives and their alkoxylation products.

(2) The easy stirrability of the reaction mixture ensures that no reaction mixture cakes to the wall of the vessel.

(3) Dark coloring of the product polyether polyol is avoided.

(4) The very low water content of the starting mixture minimizes the formation of glycols which lower the functionality of a polyether polyol.

(5) The amount of catalyst required can be drastically reduced by the addition of ethylene oxide to the mixture of starting materials.

(6) Low concentrations of catalyst are required because predominantly primary hydroxyl groups are available for the subsequent reaction with propylene oxide and/or 1,2-butylene oxide.

(7) Side reactions are greatly reduced due to the low catalyst concentration.

The high functionality, low viscosity, light colored polyols (i.e., polyols having a Color number APHA of from about 120 to about 450) produced by the process of the present invention are very valuable raw materials for the production of polyurethane foams. Polyurethane foams may be produced from these polyols by reacting them with aromatic polyisocyanates in the presence of conventional auxiliary agents and additives in accordance with any of the known methods.

Having thus described our invention, the following examples are given as being illustrative thereof. All parts and percentages given in these examples are parts by weight or percentages by weight, unless otherwise indicated.

EXAMPLES

Each of the following examples was carried out in a reaction vessel which was equipped with heating and cooling device, a stirrer mechanism, a device for displacing the air by inert gas (e.g. nitrogen) and a device for dosing of the alkylene oxide(s).

Example 1

471.6 g of glycerol were introduced with stirring into a reaction vessel at room temperature. The glycerol was heated to 95° C. 1493 g of sucrose were then introduced in the reaction vessel with stirring at this temperature. The resultant suspension was easily stirrable. 33.3 g of KOH (45.0%) were then added. The stirrability of the suspension improved. The suspension was heated to 105° C. and 2420 g of propylene oxide were gradually added at a pressure of 0.4–0.6 bar excess nitrogen pressure and at a temperature of from 103° to 107° C. 1210.5 g of ethylene oxide were then added. 403.5 g of propylene oxide were again added and stirring was continued for 5 hours at 100°–110° C. after all of the propylene oxide had been added.

The alkaline polymer mixture was then worked up in the usual manner.

The light yellow, low viscosity product obtained had the following physical properties:

| | |
|---|---|
| Hydroxyl number (mg KOH/g) | 468 |
| Water content (%) | 0.015 |
| Viscosity 25° C. (mPa · s) | 12276 |
| Average functionality (calculated) | 5.3 |
| Color | light yellow |

Example 2

1993.5 g of a sorbitol polyether obtained from sorbitol and propylene oxide, OH number 1000, containing 14.23 g of KOH were introduced at 25° C. into a reaction vessel as described in Example 1. 226.1 g of sucrose were then introduced with stirring. The mixture of starting materials was heated to 105° C. 970 g of propylene oxide were then slowly added at 100°–110° C. and 0.4–0.6 bar nitrogen excess pressure. 470.1 g of ethylene oxide were then added at 100°–110° C. and 0.4–0.6 bar nitrogen pressure and 2350.2 g of propylene oxide were finally added under the above reaction conditions. Stirring was continued for 5 hours at 100°–110° C. after all of the propylene oxide had been added.

The alkaline polymer mixture was worked up in the usual manner.

The light yellow, low viscosity product obtained had the following physical properties:

| | |
|---|---|
| Hydroxyl number (mg KOH/g) | 367 |
| Water content (%) | 0.02 |
| Viscosity 25° C. (mPa · s) | 8652 |
| Average functionality | 6.2 (calculated) |
| color (APHA) | 150 |

Example 3

724.3 g of a polyether of sorbitol and ethylene oxide, OH number 1000, containing 5.2 g of KOH were introduced at room temperature into a reaction vessel as described in Example 1. 731.7 g of sucrose and 27.7 g of 45% KOH were added with stirring. The mixture of starting materials was heated to 100°–110° C. 2108 g of ethylene oxide were slowly added at 103°–110° C. under a nitrogen excess pressure of 0.4–0.6 bar. 2439.2 g of propylene oxide were then slowly added under the above reaction conditions. Stirring was continued for 5 hours at 100°–110° C. after all of the propylene oxide had been added. The alkaline polymer was worked up in the usual manner. The product obtained had the following physical properties:

| | |
|---|---|
| Hydroxyl number (mg KOH/g) | 280 |
| Water content (%) | 0.02 |
| Viscosity 25° C. (mPa · s) | 2075 |
| Average functionality | 7.0 (calculated) |
| Color (APHA) | 350 |

Example 4

336 g of a polyether as described in Example 3 containing 2.44 g of KOH were introduced at room temperature into a reaction vessel as described in Example 1. 1025 g of sucrose were added thereto at room temperature with stirring. The mixture of starting materials was heated to 100°–110° C.

4159.7 g of ethylene oxide were slowly added at 103°–110° C. under a nitrogen excess pressure of 0.3–0.6 bar. 479.3 g of propylene oxide were then added under the above reaction conditions. Stirring was continued for 5 hours at 100°–110° C. after all of the propylene oxide had been added.

The alkaline polymer mixture obtained was worked up in the usual manner and the product obtained had the following physical properties:

| | |
|---|---|
| Hydroxyl number (mg KOH/g) | 276 |
| Water content (%) | 0.03 |
| Viscosity 25° C. (mPa · s) | 2245 |
| Average functionality | 7.5 (calculated) |
| Color (APHA) | 400 |

Example 5

875.5 g of a polyether as described in Example 3 containing 6.28 g of KOH and 227.1 g of diethylene glycol were introduced at room temperature into a reaction vessel as described in Example 1. 888.0 g of sucrose were then introduced at room temperature. The mixture of starting materials was heated to 100°–110° C.

1323.3 g of ethylene oxide were slowly added at 103°–110° C. and an excess nitrogen pressure of 0.3–0.6 bar. 3087.8 g of propylene oxide were then added under the above-mentioned reaction conditions. Stirring was continued for 5 hours at 100°–110° C. after all of the propylene oxide had been added.

The alkaline polymer mixture was worked up in the usual manner and the product polyether polyol obtained had the following physical properties:

| | |
|---|---|
| Hydroxyl number (mg KOH/g) | 371 |
| Water content (%) | 0.02 |
| Viscosity at 25° C. (mPa · s) | 5242 |
| Average functionality | 5.54 (calculated) |
| Color | yellow |

Although the invention has been described in detail in the foregoing for the purpose of illustration, it is to be understood that such detail is solely for that purpose and that variations can be made therein by those skilled in the art without departing from the spirit and scope of the invention, except as it may be limited by the claims.

What is claimed is:

1. A process for the production of a polyether having an arithmetically calculated functionality of from about 5.3 to about 7.5, a viscosity at 25° C. of from about 1,000 to about 19,000 mPa·s, and an APHA color number of from about 120 to about 150 comprising reacting
    a) a mixture containing
        i) approximately 100 parts by weight of sucrose,
        ii) from about 30 to about 1000 parts by weight of a polyol having a molecular weight of from about 62 to about 420 g/mol or an alkoxylation product of such polyol or a mixture of such polyol and alkoxylation product, and
        iii) an alkali metal hydroxide which was prepared at a temperature of from about 20° to about 110° C. with
    b)
        (1) from about 2 to about 90% by weight of ethylene oxide and
        (2) from about 10 to about 98% by weight of propylene oxide or 1,2-butylene oxide or a combination thereof at a temperature of from about 85° to about 130° C. and under nitrogen at a pressure of from about 0.3 to about 4 bar.

2. The process of claim 1 in which the alkali metal hydroxide is used in an amount of from about 500 to about 3000 parts per million.

3. The process of claim 1 in which component a) ii) is water-soluble.

4. The process of claim 1 in which component a) ii) is a mixture of polyols or a mixture of alkoxylation products of polyols or a combination of a mixture of polyols and a mixture of alkoxylation products of polyols.

5. The process of claim 1 in which the alkali metal hydroxide a) iii) is potassium hydroxide.

6. The process of claim 5 in which the potassium hydroxide is used as a concentrated aqueous solution or as an alcoholate of the polyether polyol or as a combination of a concentrated aqueous solution and an alcoholate of the polyether polyol.

7. The process of claim 5 in which the potassium hydroxide is used at a concentration of from about 600 to about 2500 ppm.

8. The process of claim 1 in which the components of the alkylene oxide mixture are introduced into mixture a) either successively or as a mixture.

9. The process of claim 1 in which b) (1) and b) (2) are used in quantities such that for each OH group in polyol a) ii) a total of from about 0.5 to about 4.0 mol of b)(1) plus b)(2) is present.

* * * * *